United States Patent [19]
Iwata et al.

[11] 4,341,449
[45] Jul. 27, 1982

[54] CAMERA CAPABLE OF STANDARD AND CLOSE-UP EXPOSURES

[75] Inventors: Hiroshi Iwata, Nara; Akitoshi Morioka, Settsu, both of Japan

[73] Assignee: West Electric Co., Ltd., Osaka, Japan

[21] Appl. No.: 181,071

[22] Filed: Aug. 25, 1980

[30] Foreign Application Priority Data
Aug. 31, 1979 [JP] Japan .................................. 54-111897
Oct. 12, 1979 [JP] Japan .................................. 54-132347

[51] Int. Cl.³ ........................ G03B 3/00; G03B 13/12; G03B 15/03
[52] U.S. Cl. ..................... 354/126; 354/197; 354/221
[58] Field of Search ............... 354/126, 145, 150, 195, 354/197, 221, 222

[56] References Cited
U.S. PATENT DOCUMENTS
3,836,934  9/1974  Suzuki et al. ........................ 354/197
4,171,887  10/1979  Hayata ........................... 354/221 X FOREIGN PATENT DOCUMENTS
2740929  3/1979  Fed. Rep. of Germany ...... 354/197

*Primary Examiner*—John Gonzales
*Attorney, Agent, or Firm*—Burgess, Ryan and Wayne

[57] ABSTRACT

A camera capable of standard and close-up exposures in which mounted in a single camera body are a light source for illuminating a minute subject, a close-up viewing optical system, a close-up optical system for exposing the minute subject at a magnified scale, a flashlight source, a standard viewing optical system such as an inverted Galilean finder, and a standard optical system including a standard lens for standard photography.

17 Claims, 21 Drawing Figures

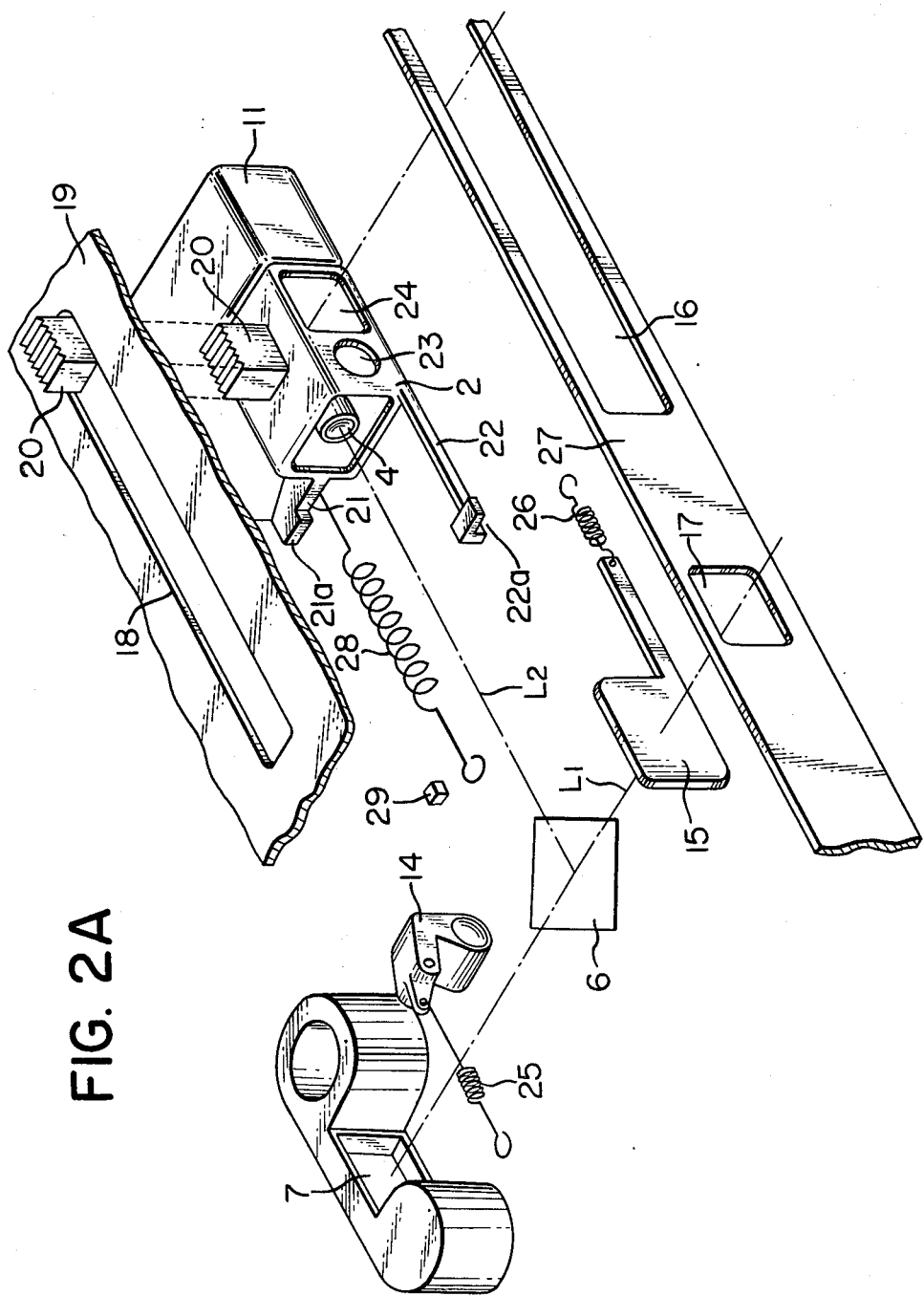

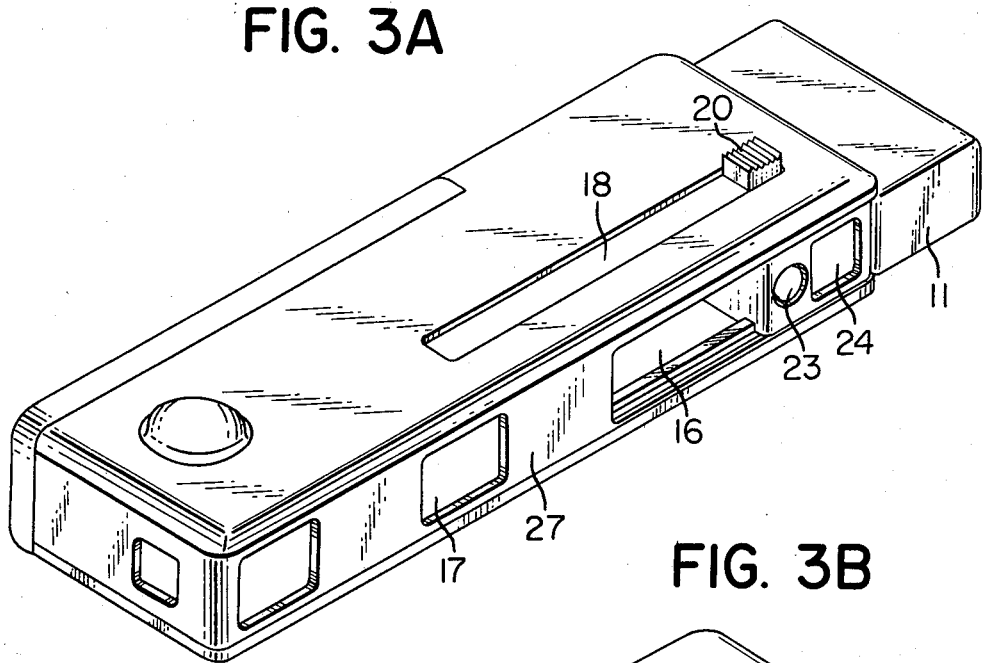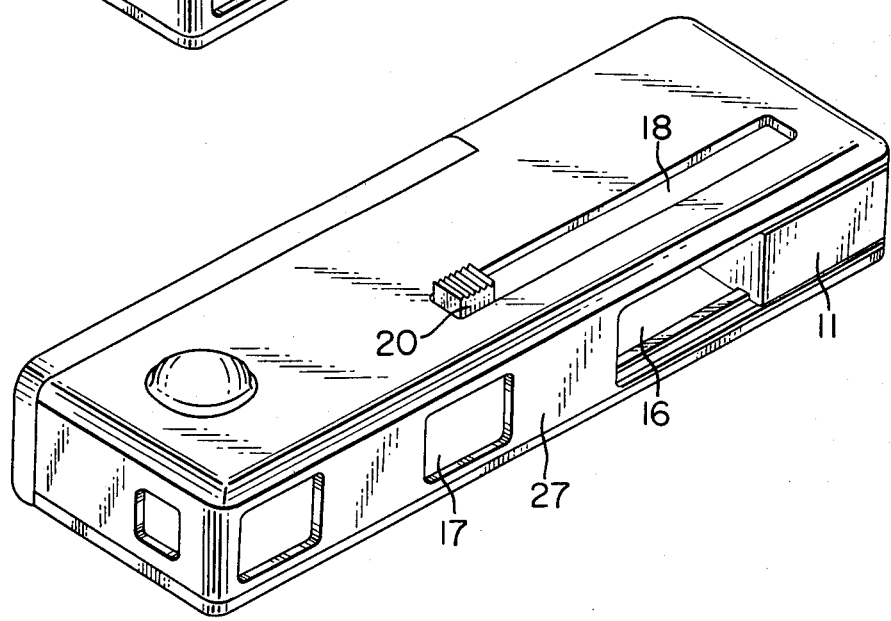

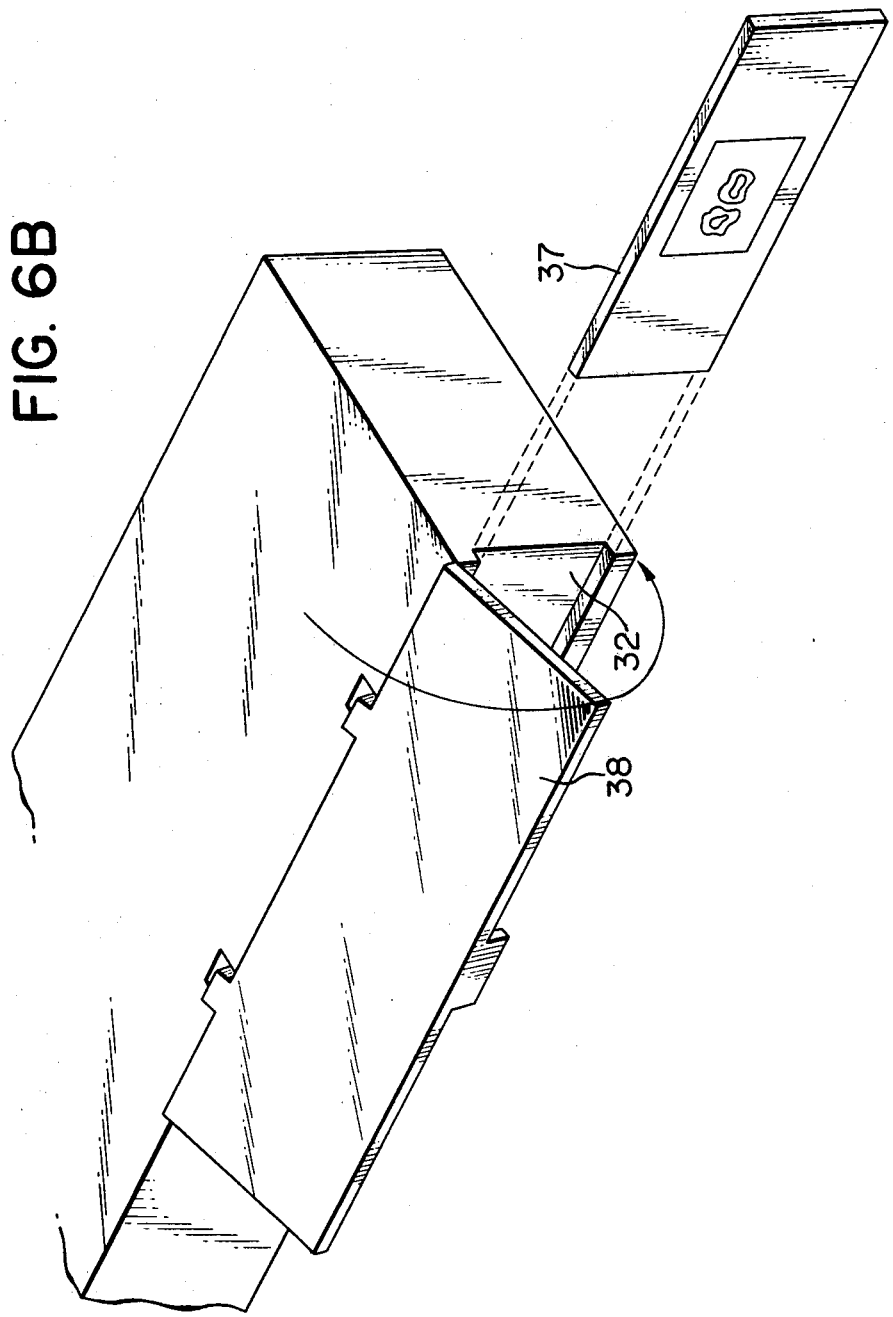

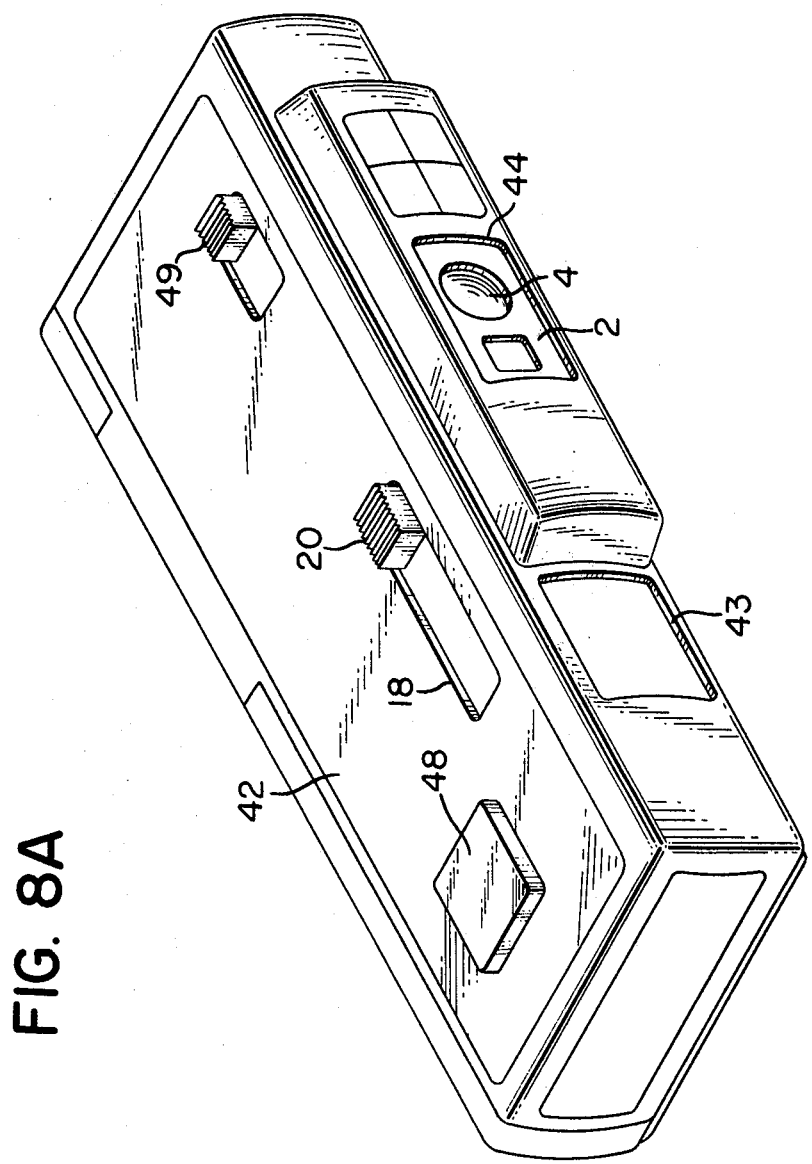

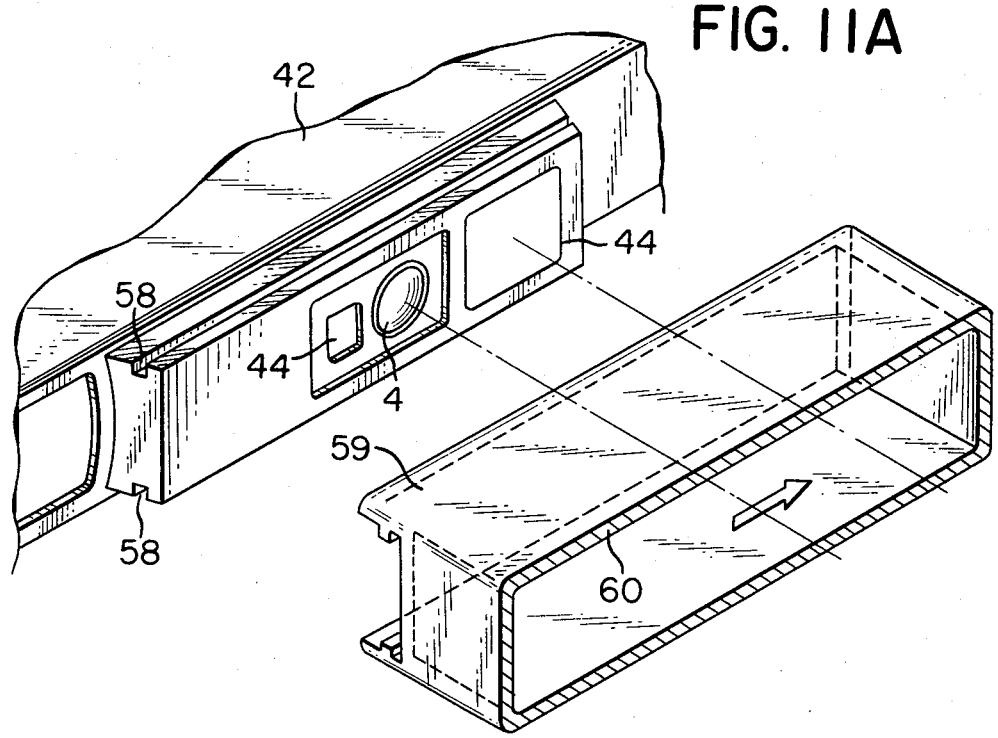
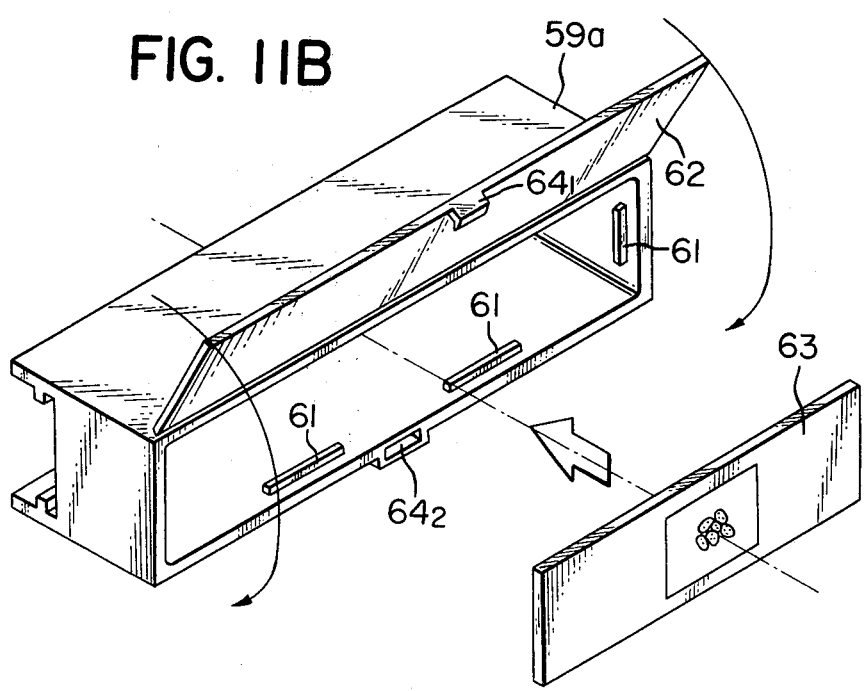

CAMERA CAPABLE OF STANDARD AND CLOSE-UP EXPOSURES

BACKGROUND OF THE INVENTION

The present invention relates to a camera capable of standard and close-up exposures.

For close-up photography, a camera such as a single-lens reflex camera of the type which can use interchangeable lenses, extension bellows, extension tubesets or magnifying lenses have been generally used so that the photographic lens can be further extended from the camera body toward a minute subject depending upon a desired magnification. In order to take pictures of subjects magnified by microscopes, special adapters have been used. With cameras other than single-lens reflex cameras, the optical systems for photography or exposure and viewing are very closely spaced apart from each other in the case of close-up photography so that focusing as well as correction of parallax becomes very difficult. Therefore, a special adapter must be provided for respective cameras.

Extension bellows are very expensive and when an extension bellows is mounted, the camera becomes so bulky that it becomes difficult to operate the camera in the field; i.e., the camera lacks mobility. When a magnifying lens is attached, the camera is still compact in size and very easy to operate, but there exists a disadvantage in that the magnification cannot be varied at all.

Extension bellows and magnifying lenses have a common defect in that standard exposures are impossible with an extension bellows or a magnifying lens attached. As a result, the extension bellows or magnifying lens must be removed for standard exposures and again attached for close-up exposures, which is very cumbersome.

From the standpoint of focusing and framing, single-lens reflex cameras are very advantageous in that a subject can be directly viewed through a photographic lens so that they are increasingly used for close-up exposures. However, with the conventional close-up attachments, the single-lens reflex cameras become so bulky that their portability is adversely affected in the field as described above. In addition, the combination of a single-lens reflex camera and a close-up attachment becomes very expensive as described above.

In close-up exposures, exposure factors must be adjusted every time an exposure is made because minute subjects are not uniformly and brightly illuminated by ambient or natural light. Furthermore, the higher the magnification, the less brilliant the image becomes so that with dim ambient light, it becomes extremely difficult to focus and frame a minute subject and to attain a correct exposure.

Anyone can observe a magnified image of a minute subject through a microscope or a magnifier in a very simple manner, but the exposure of this magnified image is not simple because of the reasons previously described.

SUMMARY OF THE INVENTION

The present invention was made therefore to overcome the above and other problems encountered in the close-up photography with the combination of a camera and a close-up attachment such as an extension bellows or a magnifying lens.

The primary object of the present invention is to provide a camera capable of standard and close-up exposures which can be switched between the standard exposure mode and the close-up exposure mode by the operation of a selection knob so that even an inexperienced photographer can take close-up exposures in an extremely simplified manner hitherto unattainable by any combination of cameras and close-up attachments.

Briefly stated, to the above and other ends, the present invention provides a camera capable of standard and close-up exposures comprising light apertures formed through the front panel of a camera body, a first optical lens which is one of the elements constituting an optical system for close-up exposure and receives the light passed through a first light aperture, a second optical lens which is one of the elements constituting an optical system for standard exposure and receives the light passed through a second light aperture, a control means for optically uncovering the first lens while covering the second lens and vice versa, a first viewfinder system which is used for close-up exposure and includes the first light inlet and a view window formed through the camera body, a second viewfinder system which is used for standard exposure and includes the second light aperture and the same view window as that in the first viewfinder system or a view window formed through the camera body, all the optical systems described above being mounted in the camera body, a flash-light source mounted in the camera body and an illumination source mounted in the camera body and used for illuminating a minute subject when viewed through the first viewfinder system.

BRIEF DESCRIPTION OF THE DRAWINGS

FIGS. 2A and 2B are exploded views corresponding to FIGS. 1B and 1C, respectively;

FIGS. 3A and 3B are perspective views corresponding to FIGS. 1B and 1C, respectively;

FIGS. 6A and 6B are fragmentary perspective views of a embodiment of the present invention;

FIG. 8A is a perspective view of the third embodiment;

FIG. 11A is a fragmentary view of a sixth embodiment of the present invention; and FIG. 11B shows an improvement or modification thereof.

Same reference numerals are used to designate similar parts throughout the figures.

DESCRIPTION OF THE PREFERRED EMBODIMENTS

First Embodiment, FIGS. 1 through 3

Figure 1A:
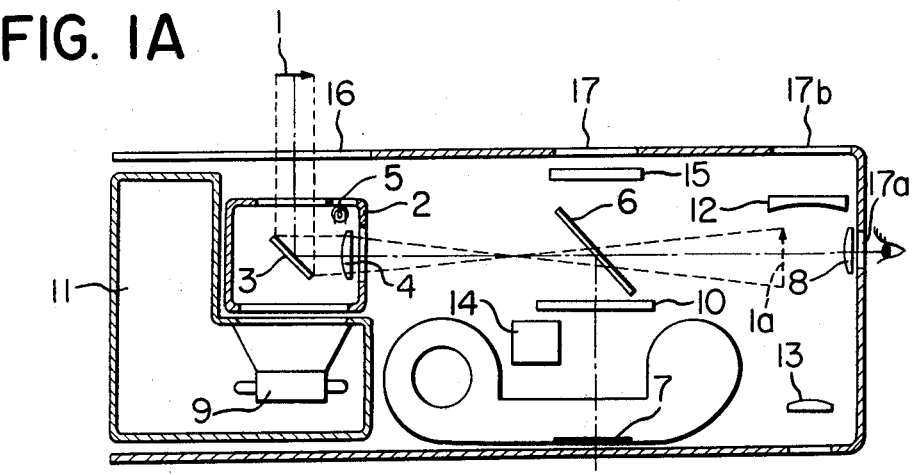
FIG. 1A is a cross sectional view of a first embodiment of the present invention in a low magnification close-up exposure mode.
Figure 1B:
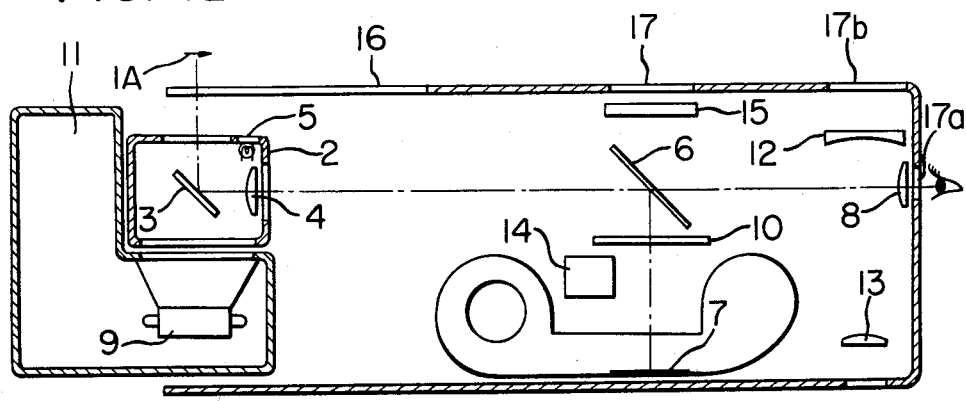
FIG. 1B is a view similar to FIG. 1A but shows a high-magnification close-up exposure mode.
Figure 1C:
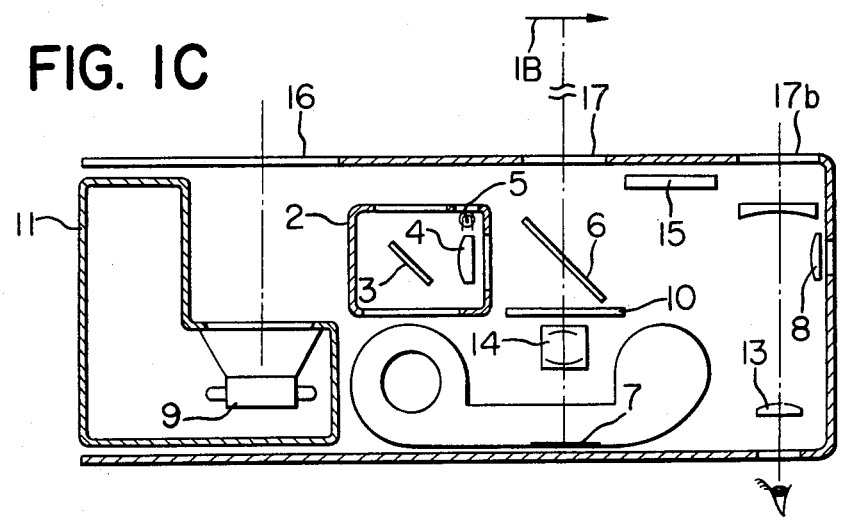
FIG. 1C is a view also similar to FIG. 1A but shows a standard exposure mode.

In FIGS. 1A, 1B and 1C is shown in cross section a first embodiment of a camera with a magnifier in accordance with the present invention. This camera is of the type in which a photographic lens is so combined with a reflecting mirror that they can be displaced in unison, thereby changing the distance between the lens and a film, i.e. moving the lens along the optical axis so that a minute subject can be photographed at various magnifications. In addition, the camera is provided with light sources for flashlight exposures and for observing a minute subject. FIGS. 1A, 1B and 1C, therefore, show three modes, respectively, of operation with a 110 film.

In FIGS. 1A, 1B and 1C, reference numeral 1 denotes a subject; 2 a lens box having a reflecting mirror 3, an objective 4 for ultra-close-ups or for observing the subject 1 and an auxiliary light source 5 capable of continuously emitting the light to the subject 1; 6, a half-mirror; 7, the film position; 8, an eyepiece magnifier for magnifying a minute subject; 9, a flash-light source; 10, a shutter; 11, a flash-light-source part; 12, an objective for observation; 13, an eyepiece for observation; 14, a standard lens; and 15, a light shield.

FIG. 1A shows the close-up mode with a magnification of 1.5 times. The light from the minute subject 1 is re-directed by the reflecting mirror to the lens 4 and is further re-directed by the half-mirror 6 so as to be focused on the film position 7.

In order to calculate the distance from the objective 4 to the film position 7 which is required for focusing the subject 1 with a desired magnification at the film position 7, Eq. (1) is used.

$$S_1 = f + f \cdot \beta \tag{1}$$

where $S_1$ = the distance from the objective 4 to the film position 7, f = the focal length of the objective 4, and $\beta$ = the desired magnification.

Assuming that the objective 4 has a focal length of 20 mm and substituting this and a desired magnification of 1.5 times into Eq. (1), we have $$S_1 = 20 + (20 \times 1.5) = 50 \text{ mm}.$$

In order to obtain a required distance from the objective 4 to the subject 1, Eq. (2) is used.

$$S_2 = f + f/\beta \tag{2}$$

where $S_2$ = the distance from the objective 4 to the subject 1. Substituting the focal length of 20 mm and the desired magnification of 1.5 times, we have $$S_2 = 20 + 20/1.5 = 33.33 \approx 33 \text{ mm}.$$

It follows therefore that when the film position 7 is spaced apart from the objective 4 by 50 mm while the subject is spaced apart from the objective 4 by 33 mm, the subject is focused at the film position 7 and magnified by 1.5 times.

An operator or photographer can see an inverted image 1a at the position corresponding to the film position 7 because the light passes through the half-mirror 6. In general, when the 110 film is developed and printed, the images are enlarged by 5 times. Therefore, it is obviously very convenient if a photographer can see the inverted image 1a which is magnified also by 5 times; that is, the same magnification as that of the actual image on the printed copy. To this end, the eyepiece magnifier 8 is used. The magnification power and focal length of an eyepiece magnifier is correlated by Eq. (3).

$$\beta = 1 + 250/f \tag{3}$$

where $\beta$ = the magnification power,

250 = the least distance of distinct vision in mm, and f = the focal length of an eyepiece magnifier used in mm.

Substituting the desired magnification of 5 times into Eq. (3) and rearranging it, we have $$f = 62.5 \text{ mm}.$$

Thus, it follows that when the eyepiece magnifier 8 has the focal length of 62.5 mm, a photographer can see the image of the subject 1 which is magnified by 5 times, the actual size of the image on the copy.

FIG. 1B shows the close-up photography with a higher magnification of, for instance, 5 times. The lens box 2 is displaced to the left from the 1.5 times close-up position shown in FIG. 1A so that the distance from the objective 4 to the film position 7 is increased accordingly. The required distance $S_1$ from the objective 4 to the film position 7 and the required distance $S_2$ from the objective 4 to a subject 1A are obtained from Eqs. (1) and (2). The results are $$S_1 = 20 + (20 \times 5) = 120 \text{ mm, and}$$

$$S_2 = 20 + 20/5 = 24 \text{ mm}.$$

Obviously, the distance $S_1$ is greater than those in the case of the 1.5 times close-up exposure while the distance $S_2$ is shorter. Through the eyepiece magnifier 8 having the focal length of 62.5 mm, a photographer can see the image of the inverted image which is magnified by 5 times.

In summary, the first embodiment is featured in that according to a desired magnification, the objective 4 with a predetermined focal length of 20 mm in this embodiment is displaced between the subject and the film position 7 along the optical axis between them and that the reflecting mirror and the half-mirror are provided so that an erect image can be focused on the film.

FIG. 1C shows the standard photography which is different from the close-up mode in that the standard lens 14 is inserted into the optical axis for photography (that is, between a subject 1B and the film position 7) between the shutter 10 and the film position 7. In addition, the lens box 2 is displaced to the right away from a first aperture 16 of the camera body so that no image will be focused on the film position through the reflecting mirror 3 and the objective 4. Furthermore, the light shield 15 which covers light-tightly a second aperture 17 so as to prevent the exposure through this aperture uncovers the same. As a result, instead of the optical axis for close-up photography from the subject 1 or 1A through the first aperture 16, the lens box 2, the half-mirror 6 and the shutter 10 to the film position, a new optical axis is established from a subject 1B, the second aperture 17, the half-mirror 6, the shutter 10 and the standard lens 14 to the film position 7. The latter optical axis is well known in the art.

Instead of seeing through the eyepiece magnifier 8 the 5 times-magnified image of the inverted image 1a in the close-up exposure, a photographer sees the subject 1B through an inverted Galilean viewfinder consisting of the lenses 12 and 13. Therefore, the camera in accordance with the present invention has two viewfinder systems for close-up and standard photography through the eyepieces 8 and 13, respectively. It is obvious that the distance to the subject 1B is by far greater as compared with the close-up exposure mode.

Next will be described the flash-light exposure system which is very effective not only in the close-up exposure because of the reasons described elsewhere but also in the standard exposure when the surrounding is dark. As described previously, the camera has the flash-light part 11 with the flash-light source 9 and the auxiliary light source 5 within the lens box 2. In the case of the close-up exposure with flash-light, the light emitted from the flash-light source 9 passes through the reflecting mirror 3 and illuminates the subject 1 or 1A. To this end, the reflecting mirror 3 capable of transmitting the flash-light is used. Prior to the exposure, a photographer can turn on the auxiliary light source 5 so as to illuminate the minute subject 1 or 1A so that he or she can view it clearly. In the case of the standard exposure, the flash-light part 11 is displaced to the left as shown in FIG. 1C so that the flash-light emitted can directly reach the subject 1B.

In the case of the flash exposure, it is obvious that the flash-light source is energized to emit flash in precise synchronism with the full wide opening of the shutter 10. In the case of the close-up exposure mode, the lens box 2 is shifted between the two positions as described above and the flash-light must be transmitted through the reflecting mirror 3 so that the flash-light part 11 including its associated circuit must be so designated and constructed as to move in unison with the lens box 2.

Next referring to FIGS. 2A to 3B, the construction of the first embodiment will be described in detail. Reference numeral 18 denotes an elongated slit formed through a top plate 19 of the camera; 20, a selection knob which is extended from the lens box 2 and slidably fitted into the elongated slit 18 so that a photographer can shift the lens box 2 to the close-up exposure position as shown in FIG. 1A or 1B or to the standard exposure position as shown in FIG. 1C; 21 and 22, first and second control levers extended from the lens box 2 for shifting the standard lens 14 and the light shield 15, respectively; 23, an aperture through which is emitted the light from the auxiliary light source 5; 24, an aperture of the lens box through which the light from the minute subject 1 or 1A enters the lens box 2; 25, a spring for normally biasing the standard lens in one direction; 26, a spring for normally biasing the light shield 15 in one direction; 27, a front mold with the first and second apertures 16 and 17; 28, a spring for normally biasing the flash-light-source part 11 in one direction; and 29, a stop for engagement with the part 11 so as to control or retain it in a predetermined position.

FIG. 2A corresponds to FIG. 1B or the close-up exposure mode with a higher magnification. In order to attain the relationship, as shown in FIG. 1B, between the lens box 2 and the half-mirror 6, a photographer shifts the selection knob 20 to the right-end position in the elongated slit 18. The selection knob 20 is retained in this position by means of a suitable device which is not shown. When the lens box 2 is shifted, the flash-light-source part 11 is also shifted in unison therewith against the bias spring 28 and retained in position by means of a suitable arresting device which is not shown.

When the lens box 2 is shifted to the first close-up exposure position shown in FIG. 2A, the first and second control levers 21 and 22 are disengaged from the standard lens 14 and the light shield 15; that is, their engaging projections 21a and 22a are released from the lens 14 and the shield 15, respectively. As a result, the standard lens 14 is moved away from the optical axis $L_1$ for photography by the bias spring 25. In like manner, by virtue of the bias spring 26, the light shield is retained in the position at which it covers light-tightly the second aperture 17; that is, the light shield 15 is advanced into the optical axis $L_1$ for the standard exposure. The light from the subject 1 passes through the first aperture 16, the aperture 24 of the lens box 2, the reflecting mirror 3 and the objective 4 within the box 2, the half-mirror 6 and the shutter 10 to the film position 7.

In the case of the exposure, the flash-light emitted from the flash-light source 9 is transmitted through a light aperture (not shown) of the flash-light-source part 11, a matching light aperture (not shown) of the lens box 2, the front light aperture 24 thereof and the first aperture 16 of the front mold 27 to the subject 1. In the case of viewing the subject with the aid of illumination, the light emitted from the auxiliary light source 5 is transmitted through the aperture 23 of the lens box 2 and the first aperture 16 which is elongated as shown in FIG. 2A.

Figure 2B:
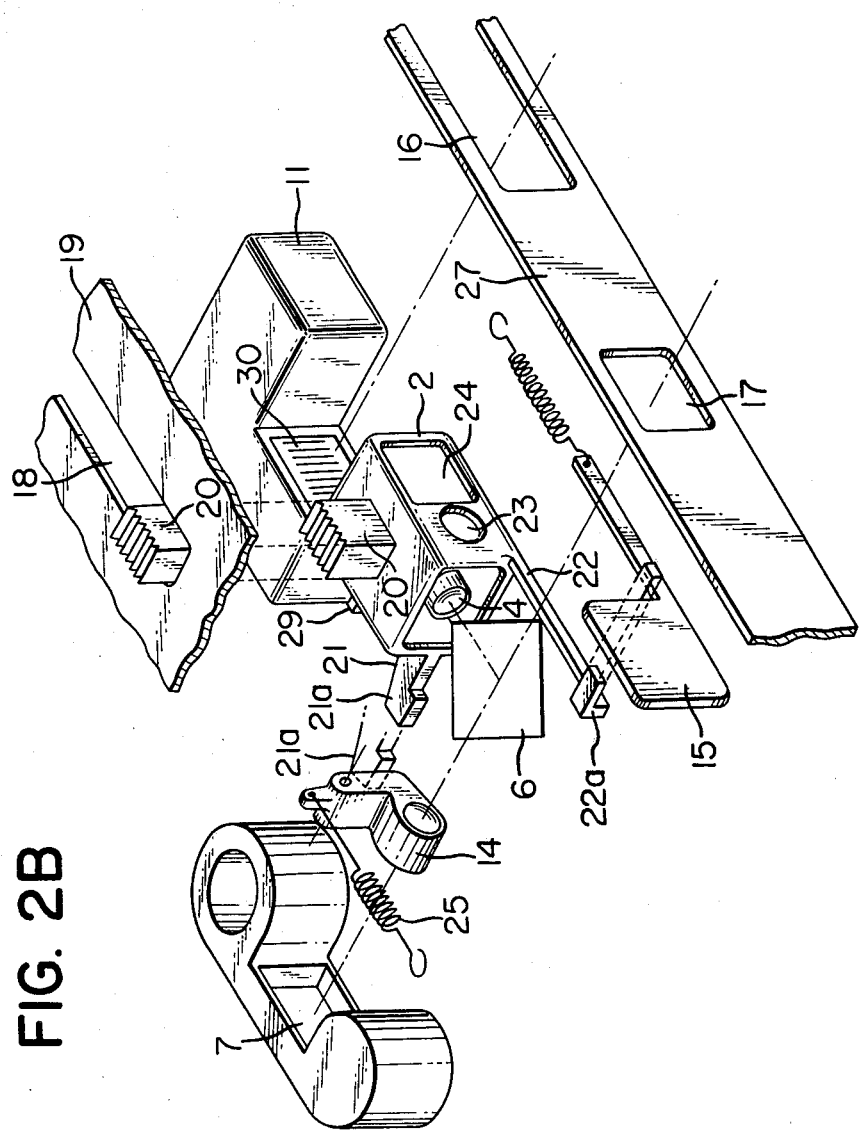

FIG. 2B corresponds to FIG. 1C or the standard exposure mode. A photographer shifts the selection knob 20 to the left-end position in the elongated slit 18 so that the lens box 2 is brought to the position shown. The flash-light-source part 11 is displaced in unison with the lens box 2 under the force of the bias spring 28, but is stopped at the position shown spaced apart from the lens box 2 because the part 11 engages with the stop 29. The engaging end 21a of the first control lever 21 and the engaging end 22a of the second control lever 22 engage with the standard lens 14 and the light shield 15, respectively, while the lens box 2 is still being shifted and push them to the left against the bias spring 26. As a result, the standard lens 14 is inserted into the optical axis while the light shield 15 is moved away therefrom, uncovering the second aperture 17. Since the lens box 2 is inserted deep into the camera body, its light aperture 24 is closed by the front mold 27 so that the light entering through the first aperture 16 will never reach the film position 7 through the lens box 2. Thus, it is very apparent that the light from the subject 1B passes through the second aperture 17, the half-mirror 6, the shutter 10 when opened and the standard lens 14 and focused on the film at the film position 7.

The flash-light-source part 11 is retained in the position by the stop 29 and spaced apart from the lens box 2 by a predetermined distance so that the light emitting aperture 30 of the part is in line with the first aperture 16 through the front mold 27. Therefore, in the case of the flash exposure, the flash-light emitted from the flashlight source 9 passes these apertures 30 and 16 and directly reaches the subject 1B.

Even when the auxiliary light source 5 is turned on, the light will not reach the exterior because the light aperture 23 of the lens box 2 is also closed or covered by the front mold 27.

FIG. 3A shows the camera in the close-up exposure position. It is seen that the selection knob 20 is at the right-end position in the slit 18; the lens box 2 is also at the right end of the elongated aperture 16; and the flash-light-source part 11 is partly extended out of the camera body. FIG. 3B shows the camera in the standard exposure position. It is seen that the selection knob 20 is at the left end of the slit 18; the lens box 2 is completely concealed by the front mold 27; and the flash-light-source part 11 is completely inserted into the camera body, but leaving the flash-light passage as described above.

The first embodiment may be summarized as follows. The camera has a plurality of photographic lenses which may be selected depending upon the close-up exposure or the standard exposure, and a plurality of light apertures which may be so selected that the light from a subject can be directed into the selected photographic lens system. This selection is accomplished by the operation of a single selection means or the knob 20. Thus, by the very simple manipulation, one of a plurality of exposure mode such as the close-up exposure with a lower magnification or a higher magnification or the standard exposure can be selected. In addition, the camera is provided with the built-in flash-light source as well as the built-in auxiliary light source. Furthermore, the camera is very simple in construction.

Figure 4:
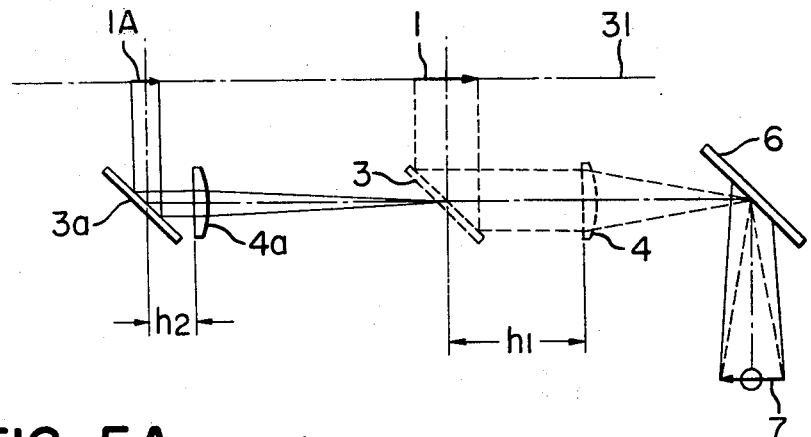
FIG. 4 is a view used for the explanation of the underlying principle of a second embodiment of the present invention.

Second Embodiment, FIGS. 4 through 6

In the case of the first embodiment, when the magnification is varied, the distance to a subject must be changed accordingly as explained with reference to Eq. (2) so that the setting of a subject or a camera is difficult. The second embodiment therefore has for its object to overcome this difficulty. According to the second embodiment, as far as a subject is positioned along the one-dot chain line 31 shown in FIG. 4, which is spaced apart by a predetermined distance from the front mold of the camera, any exposure with a desired magnification can be made. FIG. 4 shows only the optical system for close-up exposure for the sake of simplicity, and the positions of the reflecting mirror 3a and the objective 4a in the close-up exposure mode with magnifications of 1.5 times and 5 times, respectively, are indicated by the broken and solid lines.

Referring still to FIG. 4, in the case of the close-up exposure with the magnification of 1.5 times, a subject 1 on the one-dot chain line 31 is focused through the reflecting mirror 3 and the objective 4 (both indicated by the dotted lines) and the half-mirror 6 on the film position 7. In like manner, in the case of the close-up exposure with the magnification of 5 times, a subject 1A on the line 31 is focused through the reflecting mirror 3a, the objective 4a (both in the positions indicated by the solid lines) and the half-mirror 6 on the film position.

Next the reason why the subject on the line 31 is magnified by 1.5 times or 5 times when focused at the film position 7 will be discussed below. In the case of the close-up exposure with the magnification of 1.5 times, the distance $S_1$ from the objective 4 to the film position 7 must be 50 mm while the distance $S_2$ from the objective 4 to the subject 1 must be 33 mm as described in conjunction with the first embodiment. In the case of the 5 times magnification, the distance $S_1$ must be 120 mm while $S_2$, 24 mm. These distance requirements are also met in the second embodiment.

In the case of the first embodiment shown in FIGS. 1A, 1B and 1C, the objective 4 is held stationary in the lens box so that depending upon a desired magnification, the relative position of the subject must be changed so as to satisfy the required distances $S_1$ and $S_2$. However, according to the second embodiment, the objective 4 is movable relative to the reflecting mirror 3. In the case of the 1.5 times magnification, the objective 4 is spaced apart from the reflecting mirror 3 by $h_1$ while in the case of the 5 times magnification, by $h_2$. As a result, any subject on the one-dot chain line 31 is focused and magnified by 1.5 times or 5 times. In other words, according to the first embodiment, the distances $S_1$ and $S_2$ are determined from the objective 4 as a reference point which is stationary while according to the second embodiment, the objective 4 is moved so as to attain the required distance relationships.

In order to vary the distance from the reflecting mirror 3 to the objective 4 depending upon the desired magnification, a mechanism (not shown) is incorporated in the camera body and is operatively connected to the selection knob 20 (See FIG. 2) in such a way that as the latter is shifted to the 1.5 times or 5 times position in the slit, the objective 4 is displaced and spaced apart from the reflecting mirror 3 by $h_1$ or $h_2$.

Figure 5A:
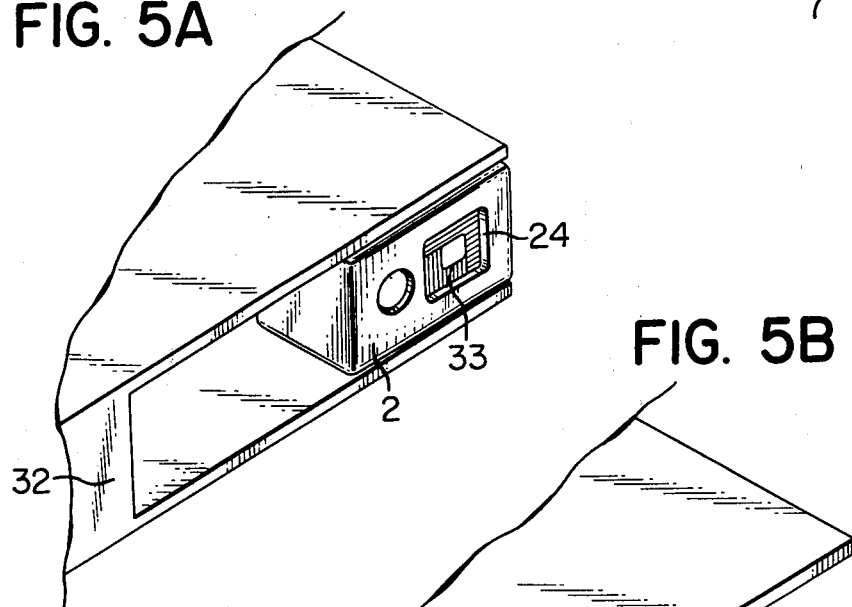
FIG. 5A is a fragmentary perspective view of the second embodiment provided with a window corresponding to the angle of view of a minute subject.
Figure 5B:
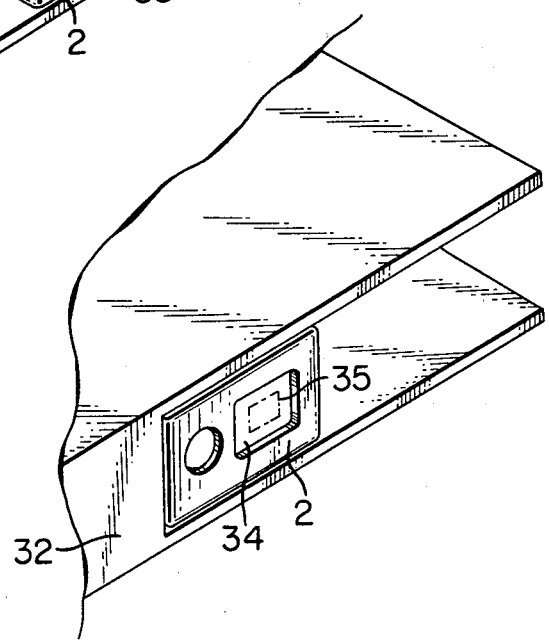
FIG. 5B is a fragmentary perspective view of the second embodiment provided with a frame marked on a glass plate of a light aperture, the frame corresponding also to the angle of view of a minute subject.

Referring to FIGS. 5A and 5B, the line 31 may be set as the front panel 32 of the camera body so that when a minute subject is placed in coplanar relationship with the front surface of the front panel 32, the close-up exposure with the desired magnification of 1.5 times or 5 times can be made in a very simple manner as compared with the first embodiment in which the distance between the objective 4 and the subject must be spatially determined.

According to the second embodiment, the opening area of the light aperture 24 of the lens box 2 is varied depending upon the selected magnification. For instance, in the case of the close-up exposure with the magnification of 5 times, an aperture 33 is set (See FIG. 5A) which corresponds to the angle of view of the subject. Then the framing can be much simplified. Alternatively, as shown in FIG. 5B, a frame 35 corresponding to the angle of view in the case of 5 times magnification can be formed on a transparent glass plate 34 by the vacuum evaporation techniques or the like.

As described above, according to the second embodiment, a subject is pressed against the front panel 32 in the case of the close-up exposure. Therefore, the front panel 32 can be so designed and constructed that a slide which is used in optical microscopic viewing can be inserted into the front panel 32. This arrangement can further simplify the close-up exposure as will be described in detail below.

Figure 6A:
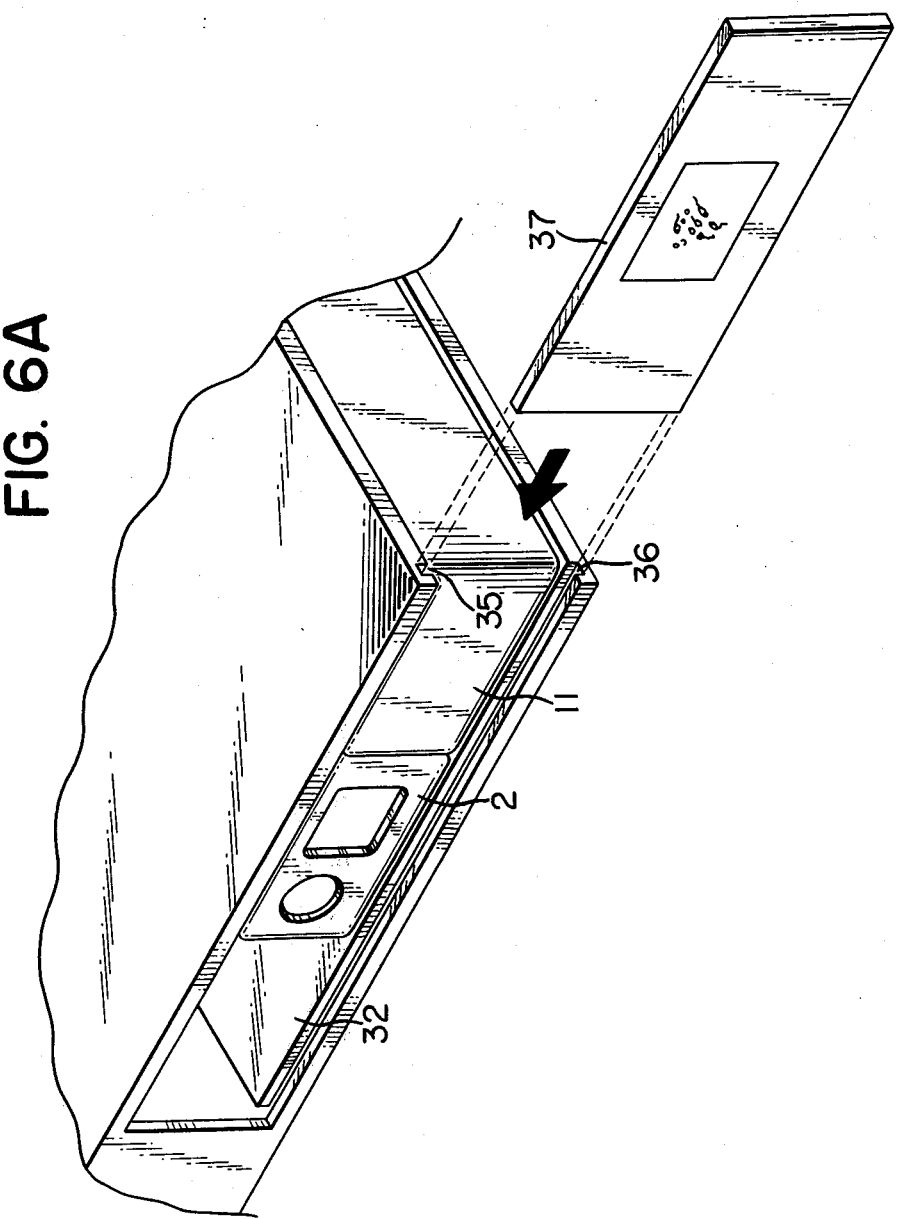

Referring to FIG. 6A, the front panel 32 is provided with upper and lower grooves 35 and 36 into which is slidably fitted a slide 37 bearing a subject. Furthermore, as shown in FIG. 6B, a pressure plate 38 can be swingably mounted on the camera body, and a bias spring (not shown) is loaded between the camera body and the pressure plate 38 so that the slide 37 can be securely held in position when inserted into the front panel 32. When the inside surface of the pressure plate 38 is dark grey or black in color, the subject on the slide 37 seems to be floating from the background so that high quality and very effective exposures can be made.

Third Embodiment, FIGS. 7 and 8

Figure 7A:
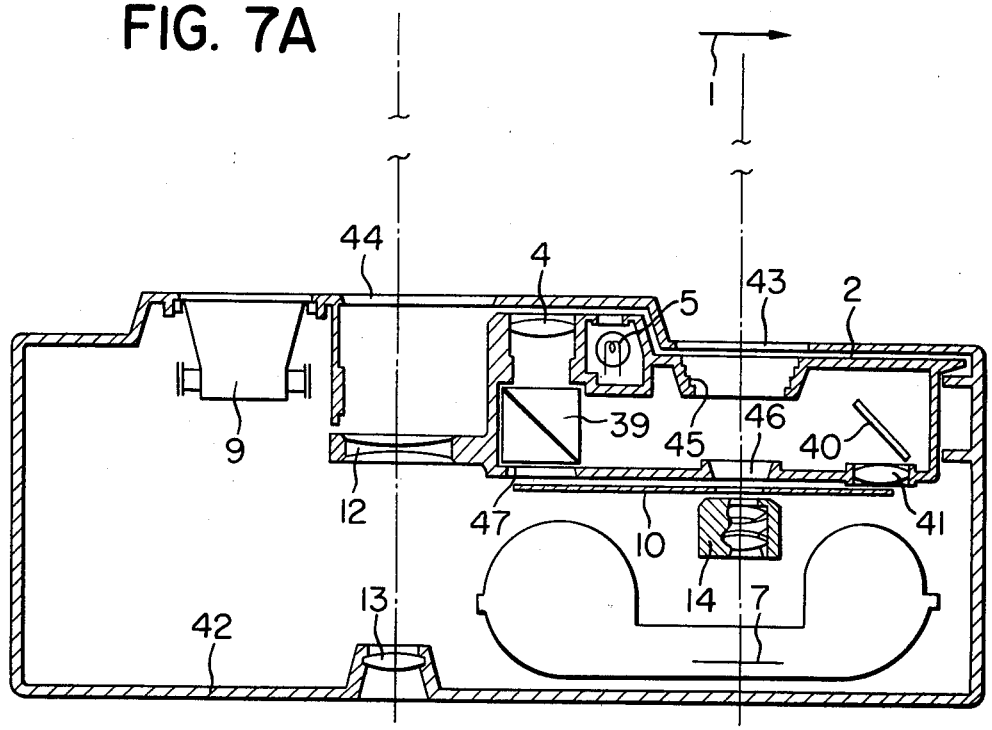
FIG. 7A is a cross-sectional view of a third embodiment of the present invention showing the standard exposure mode.
Figure 7B:
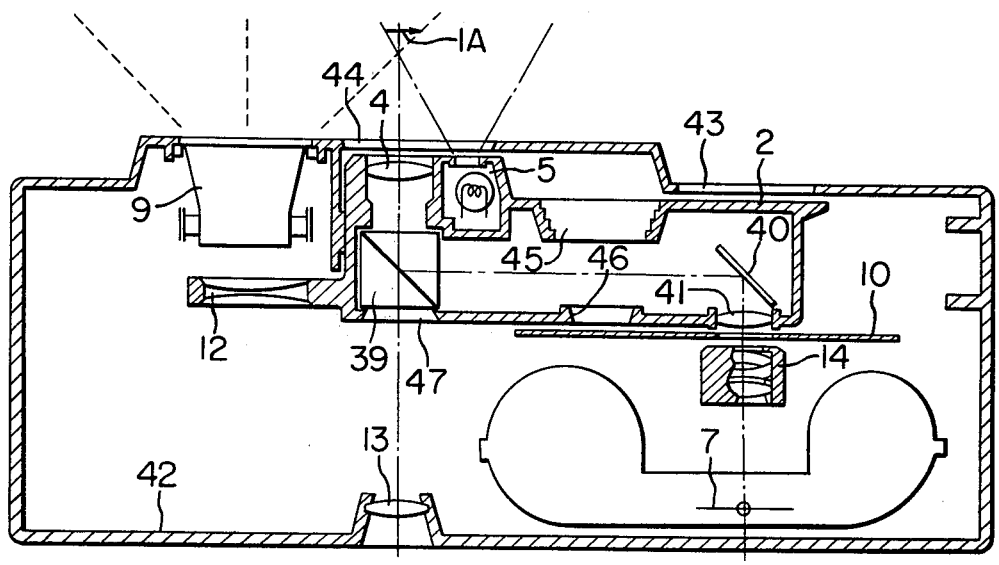
FIG. 7B is a view similar to FIG. 7A but shows the close-up exposure mode.

In FIG. 7A or 7B is shown in cross section a third embodiment which has, in addition to the numerals 1 through 14 which have been already explained, a half-mirror prism 39, a reflecting mirror 40, a close-up lens 41, a camera body 42 with a first light aperture 43 and a second light aperture 44, a first aperture 45 and a second aperture 46 of the lens box 2.

Referring to FIG. 7A showing the standard exposure mode, the light from the subject 1 is focused on the film position 7 through the first light aperture 43 of the camera body 42, the first and second apertures 45 and 46 of the lens box 2, the shutter 10 and the standard lens 14. A photographer can view the erect image of the subject 1 through the second aperture 44 of the camera body 42 and an inverted Galilean viewfinder consisting of the objective (concave) 12 mounted on the lens box 2 and the eyepiece (convex) 13. Since both the exposure and viewfinder optical systems are well known in the art, no further description shall be made in this specification.

FIG. 7B shows the close-up exposure mode in which the lens box 2 is shifted to the left from the position in FIG. 7A.

The light from a minute subject 1A passes through the second light aperture 44 of the camera body 42 and the objective 4 in the lens box 2 to the half-mirror prism 39. The light passing straightly through the half-mirror prism 39 passes through the eyepiece 13, but the light redirected by 90° is re-directed again by the reflecting mirror 40 to the close-up or magnifying lens 41 and passes through the standard lens 14 so that the magnified image is focused on the film position 7.

In the close-up exposure mode, the objective 4 and the magnifying lens 41 (both convex) constitute a conventional microscopic optical system which in turn is a conversion lens relative to the standard exposure optical system consisting of the standard lens 14.

The magnification $m_o$ of the objective 4 is expressed by $$m_o = \Delta/f_o$$

where
 $\Delta$ = the distance from the secondary focal point to the primary focal point of the objective 4 in mm, and
 $f_o$ = the focal length of the objective 4 in mm.
The magnification $m_e$ of the lens 41 is expressed by $$m_e = 250/f_e$$

where
 250 = the distance of distinctive vision in mm, and
 $f_e$ = the focal length of the lens 41 in mm.
When only the standard lens 14 is used, its magnification $m_p$ is expressed by $$m_p = f_p/250$$

where $f_p$ = the focal length of the standard lens 14 in mm. When the lenses 4, 41 and 14 are combined for the close-up exposure, the close-up magnification $M_p$ is expressed by $$M_p = m_o \cdot m_e \cdot m_p = f_p/(f_o f_e) \cdot \Delta \qquad (4)$$

The lens 4, and the half-mirror prism 39 are common in both the close-up optical system and the viewfinder system. The light passing straightly the prism 39 reaches the eyepiece 13. Therefore, the image of the subject 1A is magnified by both the objective 4 and the eyepiece 13.

As described elsewhere, the eyepiece 13 is one of the elements constituting the inverted Galilean viewfinder which is used in the case of the standard exposure mode. Therefore, opposed to the first embodiment, a photographer can use the same eyepiece 13 for viewing the subject in both the standard and close-up exposure modes.

The magnification $m_o'$ of the objective 4 is expressed by $$m_o' = \Delta'/f_o$$

where
 $\Delta'$ = the distance from the secondary focal point of the objective 4 to the primary focal point of the eyepiece 13.
The magnification $m_e'$ of the eyepiece 13 is expressed by $$m_e' = 250/f_e'$$

where $f_e'$ = the focal length in mm of the eyepiece 13. Therefore, the overall magnification $M_E$ of the viewfinder in the close-up exposure mode is expressed by $$M_E = m_o' \cdot m_e' = (250 \cdot \Delta')/(f_o f_e') \qquad (5)$$

It is convenient for photographers to view the image of the subject 1A at the actual size printed on the copy, as described elsewhere. In general, the negative 110 film is enlarged by 5 times. It follows, therefore, that the focal lengths of the lenses 4, 41 and 14 and the eyepiece 13 are so determined as to satisfy the following relationship:

$$M_E = 5M_p$$

Next the flash-light system and the illumination system of the third embodiment will be described. As described previously, the flash-light is effective not only in the close-up exposure but also in the standard exposure when the surrounding is dim. The third embodiment has the flash-light source 9 and the auxiliary light source 5 in the lens box 2 as with the case of the first embodiment.

In the standard exposure mode shown in FIG. 7A, the flash-light source 9 is so spaced apart from the optical axis of the standard lens 14 that the "pink-eye" phenomenon can be avoided. In the case of the close-up exposure mode, the flash-light source 9 is so closed to the optical axis of the objective 4 as shown in FIG. 7B that the subject 1A may be illuminated as uniformly and brightly as possible. The aperture or window of the auxiliary light source 5 is also in line with the second light aperture 44 of the camera body 42 so that the subject 1A may be brightly illuminated and consequently a photographer may view the subject 1A very clearly.

Obviously, the flash must be precisely synchronized with the moment when the shutter 10 is wide opened. The auxiliary light source or illumination source 5 can be turned on and off arbitrarily.

Figure 8B:
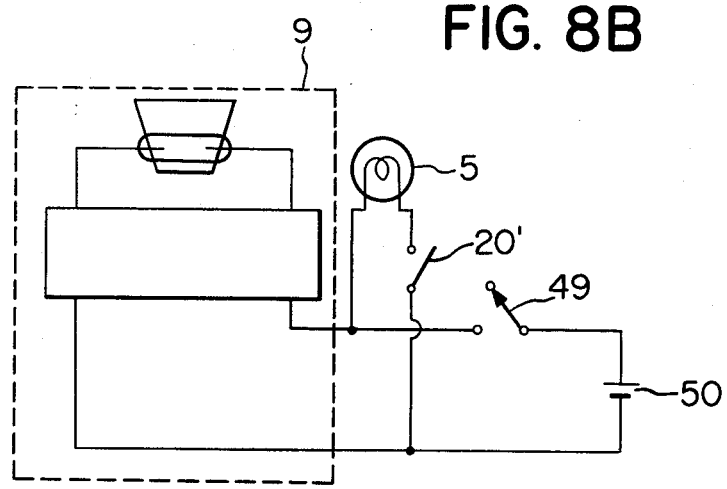
FIG. 8B is a circuit diagram of a flash-light source and an illumination lamp thereof.

FIG. 8A shows the outer appearance of the third embodiment. In addition to the slit 18 and the selection knob 20 already described in conjunction with the first embodiment, a shutter release button 48 and a control switch 49 for turning the flash-light source 9 and the auxiliary light source 5 (See FIG. 8B) are shown.

Next the mode of operation will be described. The selection lever or knob 20 is extended from the lens box 2 out of the slit 18 in the camera body 42 as described previously. The lens box 2 is provided with a click spring and an engaging means (not shown) so that the lens box 2 is securely held in the standard or close-up exposure position. The standard or close-up exposure mode is selected by shifting the selection knob 20 as described elsewhere.

FIG. 8B is a diagram of the electric circuit of the flash-light source 9 and the illumination source 5. A battery or power source 50 is connected in series through the control or on-off switch 49 to the flash-light source 9 and the auxiliary light source 5. A switch 20' is connected in series to the auxiliary light source 5 and operatively coupled to the selection knob 20 in such a way that the switch 20' is turned on when the selection knob 20 is shifted to the close-up exposure position but is turned off when shifted to the standard exposure position. Then it can be avoided to turn on the light source 5 in the standard exposure mode. Conversely, the light source 5 can be turned on only in the case of the close-up exposure mode.

The third embodiment may be summarized as follows. The standard or close-up exposure mode is selected by merely shifting the selection knob 20. In addition, the flash-light exposure is possible in both the standard and close-up modes, but the light source 5 is kept turned off in the standard exposure mode. Furthermore, the camera according to the third embodiment capable of both the standard and close-up exposure is very simple in construction.

Figure 9:
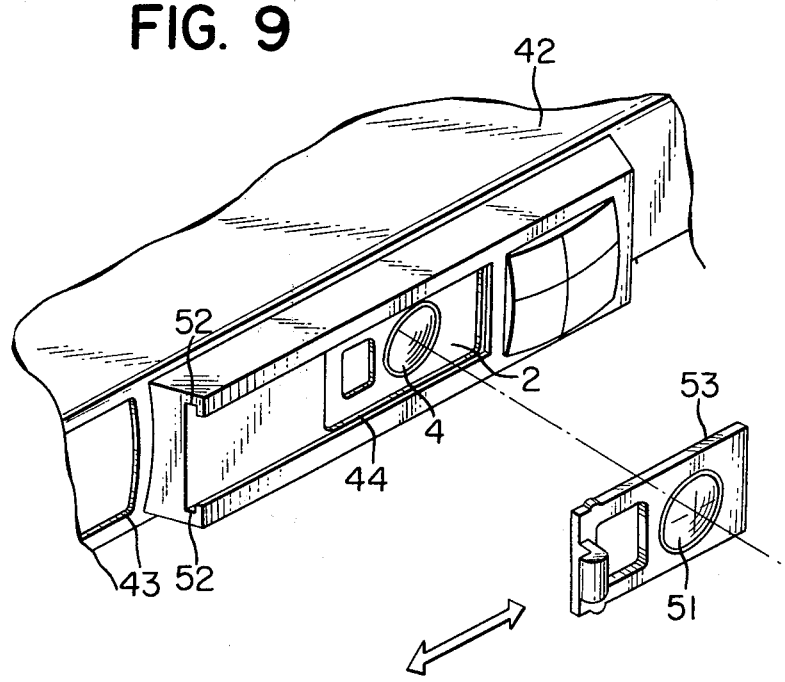
FIG. 9 is a fragmentary perspective view of a fourth embodiment of the present invention.

Fourth Embodiment, FIG. 9

The fourth embodiment shown in FIG. 9 is substantially similar in construction to the third embodiment described above with reference to FIGS. 7A to 8B except that it further includes an attachment lens 51 for changing the magnification in the case of the close-up exposure.

When the attachment lens 51 and the objective 4 are placed in contact, the focal length $f_o'$ of this thin lens combination is expressed by $$1/f_o' = 1/f_o + 1/f_a$$

where $f_a$ = the focal length of the attachment lens 51. Both the magnifications of the image focused on the film and the image viewed through the eyepiece can be increased by the same magnitude.

Still referring to FIG. 9, the front panel of the camera body is formed with attachment grooves 52 into which is slidably fitted a magnifier attachment 53 carrying the attachment lens 51. When a higher magnification is desired, the magnifier attachment 53 is slided in front of the lens box 2 in such a way that the attachment lens 51 is brought in line with the objective 4 and an aperture in the slide 53 is brought in line with the window 44 of the auxiliary light source.

Thus, the fourth embodiment is capable of the standard exposure, the close-up exposure with a low magnification and the close-up exposure with a high magnification.

Fifth Embodiment, FIG. 10

Figure 10A:
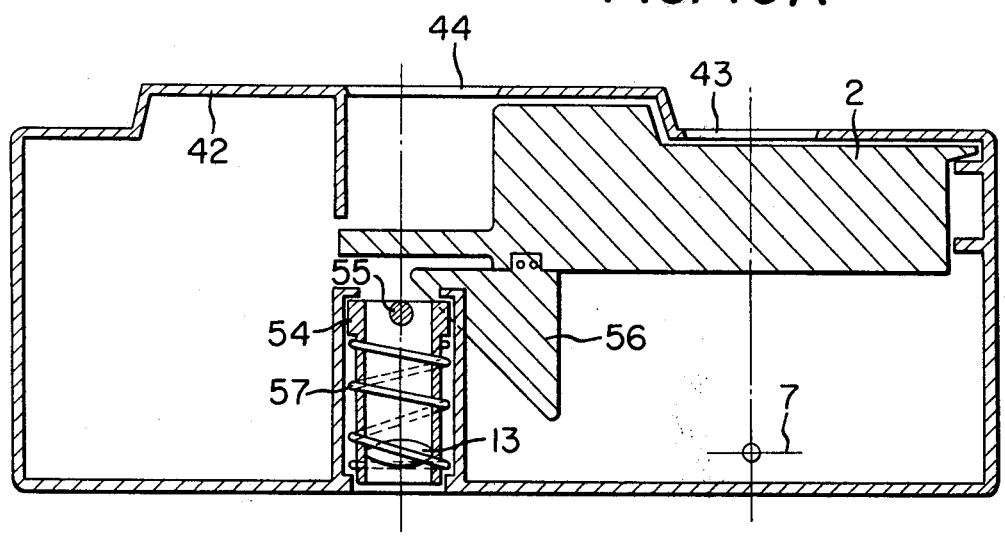
FIG. 10A is a cross sectional view of a fifth embodiment of the present invention showing the standard exposure mode.
Figure 10B:
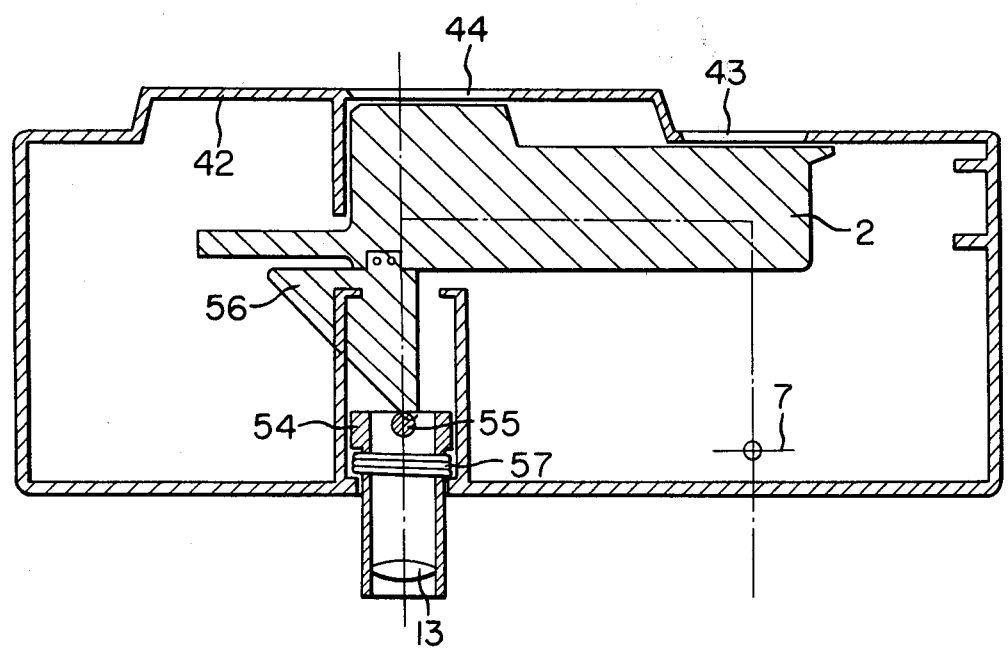
FIG. 10B is a view similar to FIG. 10A but shows the close-up exposure mode.

Briefly stated, the fifth embodiment shown in FIGS. 10A and 10B is structurally featured in that the eyepiece 13 is movable axially so that in the close-up exposure mode the distance from a subject to the eye can be increased and consequently the viewing becomes easy and convenient.

Since the distance $\Delta'$ (See Eq. (5)) from the secondary focal point of the objective 4 to the primary focal point of the eyepiece 13 changes, the latter must have a focal length $f_e''$ different from that of the eyepiece used in the embodiments previously described. Therefore, the following relationship must be satisfied.

$$M_E = (250 \cdot \Delta'')/(f_o \cdot f_e'') = 5 \, M_p$$

Since the eyepiece 13 has a different focal length in the fifth embodiment, the objective 12, which is combined with the eyepiece 13 to form the inverted Galilean viewfinder, must be changed accordingly.

Still referring to FIGS. 10A and 10B, the eyepiece 13 is mounted in a lens barrel 54 the front end of which is normally pressed under the force of a bias spring 57 against the flange at the front end of a hollow cylinder extended from the back plate of the camera body. A pin 55 is extended from the lens barrel 54 and is pressed against the hypotenuse of a triangular cam plate 56 extended from the lens box 2. When the lens box 2 is shifted from the standard exposure position shown in FIG. 10A to the close-up exposure position shown in FIG. 10B in a manner substantially similar to that described previously, the cam plate 56 forces the pin 55 backward against the bias spring 57 and consequently the lens barrel 54 and hence the eyepiece 13 are extended out of the camera body as shown in FIG. 10B. When the lens box 2 is shifted to the standard exposure position, the lens barrel 54 is forced into the camera body under the force of the bias spring 57.

The structural feature of the fifth embodiment may be summarized in that the eyepiece is extended out of the camera body in the close-up exposure mode but is withdrawn in the standard exposure mode.

Sixth Embodiment, FIG. 11

The sixth embodiment shown in FIGS. 11A and 11B is substantially similar in construction to the third embodiment described previously with reference to FIGS. 7A to 8B except the provision of an attachment or hood 59 on which a slide bearing a subject or a sheet-like subject can be mounted and which in turn can be removably mounted on the camera body 42.

The hood 59 is in the form of a box with front and rear walls removed as shown in FIG. 11A. The box-shaped hood 59 can be mounted on the camera body 42 by sliding the guide rails of the hood 59 into the matching guide grooves 58 of the camera body 42 in such a way that the hood 59 surrounds not only the second light aperture 44 but also the window of the flash-light source 9. A slide or a sheet-like subject can be attached to the front end 60 (hatched portion) of the front aperture of the hood 59. Therefore, the distance from the objective 4 to the slide or sheet-like subject mounted on the hood (when mounted on the camera body 42) must be so selected that the subject on the slide or the sheet-like subject can be sharply focused on the film. Thus even a flat subject such as images printed on a sheet of paper can be clearly viewed and sharply focused in the close-up exposure mode.

FIG. 11B shows a modification or improvement of the hood 59 described above with reference to FIG. 11A. The hood 59a bus stops 61 extended from the upper, bottom and side walls and a pressure plate 62 hingedly attached to the upper wall of the hood 59a. The pressure plate 62 has a tongue or projection 64₁ which engages with an engaging hole 64₂ at the bottom of the front aperture so that the pressure plate 62 can be securely in the slide holding position.

Even when the hood 59 or 59a is mounted on the camera body 42, the flash-light and the light from the auxiliary light source 5 can uniformly and brightly illuminate the subject mounted on the hood 59 or 59a.

In summary, the sixth embodiment has the attachment for the close-up exposure which enables clear viewing and sharp focusing of a flat subject or a sheet-like subject.

What is claimed is:

1. A camera capable of standard and close-up exposures comprising
    a first light aperture formed through a camera body for permitting the transmission of the light from a subject into said camera body,
    an optical system for standard photography for transmitting the light from said first light aperture through a shutter mechanism and a standard lens, thereby focusing the image of said subject on a film,
    a second light aperture formed through said camera body for permitting the transmission of the light from a subject into said camera body,
    an optical system for close-up photography having at least one magnifying objective and a reflecting mirror for directing the light from said second light aperture to said shutter mechanism, thereby focusing the magnified image of said subject on a film,
    a selection means for selecting said optical system for standard photography or said optical system for close-up photography,
    a standard viewing optical system used in conjunction with said optical system for standard photography for permitting a photographer to view the image of a subject to be exposed through said optical system for standard photography,
    a close-up viewing optical system used in conjunction with said optical system for close-up photography for permitting a photographer to view the image of a subject to be exposed through said optical system for close-up photography,
    a flash-light source disposed within said camera body for emitting flash-light for flash exposure, and an auxiliary light source disposed within said camera body and used for illuminating a subject so as to facilitate the viewing thereof,
    whereby by said selection means either said optical system for standard photography or said optical system for close-up photography is selected to focus the image of a subject on a film held on the same position regardless of standard or close-up photography.

2. A camera capable of standard and close-up exposure as set forth in claim 1 wherein
    said optical system for close-up photography comprises:
    said second light aperture,
    a lens box in which are mounted said reflecting mirror for reflecting the light from said second light aperture and said magnifying objective,
    a half mirror to which is re-directed the light by said reflecting mirror, and;
    said optical system for standard photography comprises said first light aperture, a movable light shielding means which is moved in unison with said lens box in such a way that in standard photography said light shielding means uncovers said first light aperture but in close-up photography covers light-tightly said first light aperture, and said standard lens;
    said close-up viewing optical system includes a magnifying eyepiece for imaging at a magnified scale the image formed by said magnifying objective; said standard viewing optical system comprises an objective and an eyepiece arranged independently of said magnifying objective, said standard lens and said magnifying eyepiece; and
    a means for shifting said lens box along the axis of said optical system for close-up photography in such a way that the distance from said magnifying objective to a film position is increased and said standard lens is retracted away from said optical system for close-up photography when said optical system for close-up photography is selected.

3. A camera capable of standard and close-up exposures as set forth in claim 1 wherein
    said auxiliary light source is so arranged so that the light emitted from said auxiliary light source is propagated through said second light aperture.

4. A camera capable of standard and close-up exposures as set forth in claim 2 wherein
    said lens box has a selection knob extending out of said camera body, a first control lever releasably engageable with said standard lens and a second control lever releasably engageable with said light shielding means; and
    when said lens box is shifted from the close-up exposure position away from said second light aperture to the standard exposure position, said first and second control levers are engaged with said standard lens and said light shielding means, respectively, thereby inserting said standard lens into said optical system for standard photography and causing said light shielding means to uncover said first light aperture, but when said lens box is shifted from said standard exposure position to said close-up exposure position, said first and second control levers are released from said standard lens and said light shielding means, respectively, so that the standard lens is retracted away from said optical path for normal photography and said light shielding means is caused to cover said first light aperture light-tightly.

5. A camera capable of standard and close-up exposures as set forth in claim 2 or 4 wherein
    said magnifying objective in said lens box is movable along the axis of said optical system for close-up photography in response to the movement of said lens box; and the position of said second light aperture is selected substantially in coplanar relationship with a plane any subject on which is sharply focused on a film through said magnifying objective.

6. A camera capable of standard and close-up exposures as set forth in claim 5 wherein said camera body is formed with grooves into which is slidably inserted a slide or the like said grooves being adapted to align said slide or the like against the rim of said second light aperture.

7. A camera capable of standard and close-up exposures as set forth in claim 1 having a lens box and wherein said standard viewing optical system comprises said second light aperture, a viewing objective movable in unison with said magnifying objective, and an eyepiece securely mounted on said camera body;

said close-up viewing optical system comprises said second light aperture, said magnifying objective and said eyepiece which is used in common in both the standard and close-up exposures.

8. A camera capable of standard and close-up exposures as set forth in claim 1 wherein said optical system for close-up photography comprises a lens box having at least a first magnifying objective for receiving the light passing through said second light aperture, a half-mirror prism for passing part of the light from said first magnifying objective straight to an eyepiece through a viewing objective while re-directing the remainder of the light through 90°, a reflecting mirror for redirecting the light redirected by said half-mirror prism through a second magnifying objective and said shutter mechanism to said standard lens, a first aperture and a second aperture which, when aligned with said first light aperture of said camera body, permit the light from a subject to directly enter said standard lens, a third light aperture from which the light passed straight through said half-mirror prism emerges and enters said eyepiece when said third light aperture is aligned with said eyepiece, and said auxiliary light source which, when turned on, emits light through said second light aperture through said camera body for illuminating a subject; and said lens box is movable between a first standard exposure position in which said first light aperture of said camera body, said first and second light apertures of said lens box and said standard lens are optically aligned and said second light aperture of said camera body, said viewing objective and said eyepiece are optically aligned and a second position or a close-up exposure position in which said first magnifying objective, said half-mirror prism and said eyepiece are optically aligned, said second magnifying objective is optically aligned with said standard lens and said first and second light apertures of said lens box are out of line with said first light aperture of said camera body.

9. A camera capable of standard and close-up exposures as set forth in claim 7 or 8 wherein said eyepiece is mounted in a lens barrel which is so mounted on said camera body as to be retracted into said camera body or extended out of said camera body;

said lens barrel is loaded with a bias spring so that said lens barrel can be normally held in the retracted position; and p1 a lens barrel control means adapted to extend said lens barrel out of said camera body against said bias spring when said lens box is brought to said second or close-up exposure position.

10. A camera capable of standard and close-up exposures as set forth in claim 7 wherein said standard viewing objective is mounted on said lens box; and a selection knob or the like is extended from said lens box out of said camera body for shifting said lens box between said first position in which said first light aperture through said camera body, a first and a second light aperture of said lens box, said shutter mechanism and said standard lens are optically aligned and said second light aperture, said standard viewing objective and said eyepiece are optically aligned and said second position in which said second light aperture through said camera body, a third light aperture, a first magnifying objective, a half-mirror prism, a fourth light aperture of said lens box and said eyepiece are optically aligned, said reflecting mirror, a second magnifying objective a fifth light aperture of said lens box, said shutter mechanism and said standard lens are optically aligned and said lens box light-tightly covers said first light aperture through said camera body.

11. A camera capable of standard and close-up exposures as defined in claim 9 wherein said camera body is formed with a first pair of guide grooves in the vicinity of said second light aperture thereof; and a slider is provided which carries an auxiliary magnifying objective said slider is releasably and slidably fitted into said pair of guide grooves in such a way that said auxiliary objective on said slider is optically aligned with said first magnifying objective.

12. A camera capable of standard and close-up exposures as set forth in claim 9 wherein said camera body is formed with a pair of guide grooves in the vicinity of said second light aperture for mounting a hood;

a hood having a front aperture adapted to be releasably, and slidably fitted into said pair of guide grooves, the front aperture of said hood being spaced apart from said magnifying objective by a predetermined distance when said hood is mounted on said camera body.

13. A camera capable of standard and close-up exposures as set forth in claim 12 wherein said hood is adapted to releasably receive a slide on which is mounted a subject.

14. A camera capable of standard and close-up exposures as set forth in claim 1 wherein said camera body has a switching means which is operable from the exterior of said camera body for controlling said flash-light source and said auxiliary light source.

15. A camera capable of standard and close-up exposures as set forth in claim 14 having a lens box and a selection knob for selecting standard or close-up exposures wherein said switching means comprises a first switch for turning on or off the power to said flash-light source and a second switch which is so operatively connected to said selection knob that when said lens box is brought to said close-up exposure position said second switch is turned on but when said lens box is brought to said first or standard exposure position said second switch is turned off.

16. A camera capable of standard and close-up exposures as set forth in claim 1 having a lens box wherein said reflecting mirror is arranged wherein said flash-light source is movable between a first standard photography and a second close-up photography position and is normally held in said first position by a bias means and is moved in unison with said lens box against said bias means to said second position;

in said first position for standard photography, said flash-light source is held in said first position with said lens box retracted away from said flash-light source so that the light emitted therefrom is transmitted through a first light guide channel comprising said second light aperture;

in said second position for close-up photography said lens box and said flash-light source are so combined that the flash-light emitted from said flash-light source is transmitted through a light guide channel comprising said lens box and said second aperture.

17. A camera capable of standard and close-up exposures as set forth in claim 6 further comprising a pressure plate adapted to press said slide or the like against the rim of said second light aperture.

* * * * *